(12) United States Patent
Kim

(10) Patent No.: US 6,188,459 B1
(45) Date of Patent: *Feb. 13, 2001

(54) IN-PLANE SWITCHING TYPE LIQUID CRYSTAL DISPLAY DEVICES HAVING IMPROVED APERTURE RATIO AND METHODS OF FABRICATION THEREFOR USING NONUNIFORM SPACING BETWEEN PIXEL AND COMMON ELECTRODES

(75) Inventor: Dong-Gyu Kim, Kyungki-do (KR)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/951,425

(22) Filed: Oct. 16, 1997

(30) Foreign Application Priority Data

Oct. 21, 1996 (KR) .................................. 96-47507

(51) Int. Cl.$^7$ .................................. G02F 1/1343
(52) U.S. Cl. .................................. 349/141
(58) Field of Search .................. 349/144, 143, 349/141, 142, 148, 147

(56) References Cited

U.S. PATENT DOCUMENTS

| | | | |
|---|---|---|---|
| 5,600,464 | * 2/1997 | Ohe et al. ........................... | 349/123 |
| 5,745,207 | * 4/1998 | Asada et al. ....................... | 349/141 |
| 5,760,856 | * 6/1998 | Yanagawa et al. ................. | 349/42 |
| 5,760,857 | * 6/1998 | Yanagawa et al. ................. | 349/141 |
| 5,796,638 | 8/1998 | Kang et al. ......................... | 364/578 |

FOREIGN PATENT DOCUMENTS

| | | |
|---|---|---|
| 0 588 568 A2 | 3/1994 | (EP) . |
| 0 588 568 A3 | 3/1994 | (EP) . |
| 7-128683 | 5/1995 | (JP) . |
| 7-225388 | 8/1995 | (JP) . |

OTHER PUBLICATIONS

Rabaey, Jan M., "Digital Integrated Circuits, A Design Perspective," Prentice–Hall, Upper Saddle River, New Jersey, 1996, pp. 97–104.

* cited by examiner

Primary Examiner—Walter J. Malinowski
(74) Attorney, Agent, or Firm—Myers Bigel Sibley & Sajovec

(57) ABSTRACT

A pixel is formed on a substrate for a panel of an LCD display, disposed adjacent a data line. The pixel includes a plurality of spaced apart elongate pixel electrodes extending parallel to the data line and a plurality of spaced apart elongate common electrodes extending parallel to the data line and interspersed among the pixel electrodes such that a respective pixel electrode is disposed adjacent a respective common electrode. The common and pixel electrodes define a plurality of gaps, a respective one of the gaps separating a common electrode and a pixel electrode, the plurality of gaps having nonuniform widths. Preferably, the plurality of gaps includes a first group of gaps having a first width and a second group of gaps having a second width. According to one embodiment, the first group of gaps includes all of the plurality of gaps except a gap between one common electrode nearest the data line and a pixel electrode nearest the one common electrode. According to another embodiment, the first group of gaps includes all of the plurality of gaps except a gap between a first common electrode nearest the data line and a pixel electrode nearest the first common electrode and a gap between a second common electrode furthest from the data line and a pixel electrode nearest the second common electrode.

16 Claims, 4 Drawing Sheets

IN-PLANE SWITCHING TYPE LIQUID CRYSTAL DISPLAY DEVICES HAVING IMPROVED APERTURE RATIO AND METHODS OF FABRICATION THEREFOR USING NONUNIFORM SPACING BETWEEN PIXEL AND COMMON ELECTRODES

FIELD OF THE INVENTION

The present invention relates to liquid crystal display (LCD) devices and methods of fabrication therefor, more particularly, to in-plane switching (IPS) type LCD devices and methods of fabrication therefor.

BACKGROUND OF THE INVENTION

Liquid crystal display (LCD) devices are commonly used flat panel display devices. LCD devices include twisted-nematic (TN) type devices, which may have switching elements such as thin-film transistors (TFTs) for controlling respective pixels, and super-twisted-nematic (STN) type devices. TN and STN devices typically include first and second substrates which have opposing transparent common and pixel electrodes formed thereon, respectively, with a liquid crystal material being sandwiched between the substrates. Unfortunately, TN and STN type LCD devices typically have narrow viewing angles, especially in an up-down direction. Furthermore, since the common electrode and the pixel electrodes are formed on separate substrates, and the two substrates may connected in order to convey signals therebetween, numerous and difficult process steps may be required to produce a display device.

To avoid these problems, in-plane switching (IPS) type LCD devices have been developed. In an IPS LCD device, a plurality of pixel electrodes and common electrodes are formed on the same substrate, as described in European Patent Application No. 93307154.0. The electric field developed between the pixel electrode and the common electrode, which affects the orientation of the molecules of the liquid crystal, is aligned parallel to the substrate, in contrast to the perpendicular electric fields produced by the electrodes of a typical TN or STN LCD device. Unfortunately, however, conventional IPS LCD devices may have an undesirably small aperture ratio, especially when all the electrodes are formed on one substrate.

SUMMARY OF THE INVENTION

In light of the foregoing, it is an object of the present invention to provide an in-plane switching (IPS) type liquid crystal display (LCD) device with improved aperture ratio.

This and other objects, features and advantages are provided according to the present invention by IPS type LCD devices in which common electrodes and pixel electrodes of a pixel have a width minimized according to a design rule such as a maximum resistance, and are spaced to provide the same maximum gap therebetween, except for a different gap separating an outlying electrode from an adjacent electrode. This nonuniform gap may be located on only one side of the pixel, separating an outlying electrode nearest a data line from an adjacent pixel, with the outlying electrode being separated from the data line by a gap which is minimized according to a design rule such as a photolithographic margin and/or a maximum coupling capacitance. Alternatively, the pixel may have two non-uniform gaps which separate two respective outlying electrodes from respective adjacent electrodes. By providing the nonuniform gaps, increased aperture ratio may be achieved over pixels in which common and pixel electrodes are uniformly spaced.

In particular, according to the present invention, a panel for a liquid crystal display device includes a substrate and a data line on the substrate, extending along a first direction. A pixel is formed on the substrate, disposed adjacent the data line, and includes a plurality of spaced apart elongate pixel electrodes extending parallel to the data line, and a plurality of spaced apart elongate common electrodes extending parallel to the data line and interspersed among the pixel electrodes such that a respective pixel electrode is disposed adjacent a respective common electrode. The common and pixel electrodes define a plurality of gaps, a respective one of the gaps separating a common electrode and a pixel electrode, the plurality of gaps having nonuniform widths. Preferably, the plurality of gaps includes a first group of gaps having a first width and a second group of gaps having a second width. According to one embodiment, the first group of gaps includes all of the plurality of gaps except a gap between one common electrode nearest the data line and a pixel electrode nearest the one common electrode. According to another embodiment, the first group of gaps includes all of the plurality of gaps except a gap between a first common electrode nearest the data line and a pixel electrode nearest the first common electrode, and a gap between a second common electrode furthest from the data line and a pixel electrode nearest the second common electrode.

Preferably, the common electrodes and the pixel electrodes have a minimum width according to a first design rule, and the data line has a minimum width according to a second design rule; the first and second design rules may include a resistance, for example. The first gap width preferably is a maximum width according to a third design rule such as a driving voltage, while the second gap width preferably is a minimum width according to a fourth design rule such as a photolithographic margin and/or a coupling capacitance. The data line and a nearest one of the pixel electrodes and the common electrodes preferably define a gap therebetween having a minimum width according to a fifth design rule such as a photolithographic margin and/or a coupling capacitance.

According to method aspects of the present invention, a panel of a liquid crystal display device is fabricated by forming a data line on a substrate, extending along a first direction. A pixel is formed on the substrate adjacent the data line, the pixel including a plurality of spaced apart elongate common electrodes extending parallel to the data line and a plurality of spaced apart elongate pixel electrodes extending parallel to the data line and interspersed among the common electrodes such that a respective one of the pixel electrodes is disposed adjacent a respective common electrode. The common and pixel electrodes define a plurality of gaps, a respective one of the gaps separating a common electrode and a pixel electrode, the plurality of gaps having nonuniform widths. Preferably the plurality of gaps includes a first group of gaps having a first width and a second group of gaps having a second width. Preferably, the common electrodes and the pixel electrodes have a minimum width according to a first design rule, the data line has a minimum width according to a second design rule, the first width is a maximum width according to a third design rule, the second width is a minimum width according to a fourth design rule, and the data line and a nearest one of the pixel electrodes and the common electrodes define a gap therebetween having a minimum width according to a fifth design rule. Improved IPS type LCD devices may thereby be formed.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
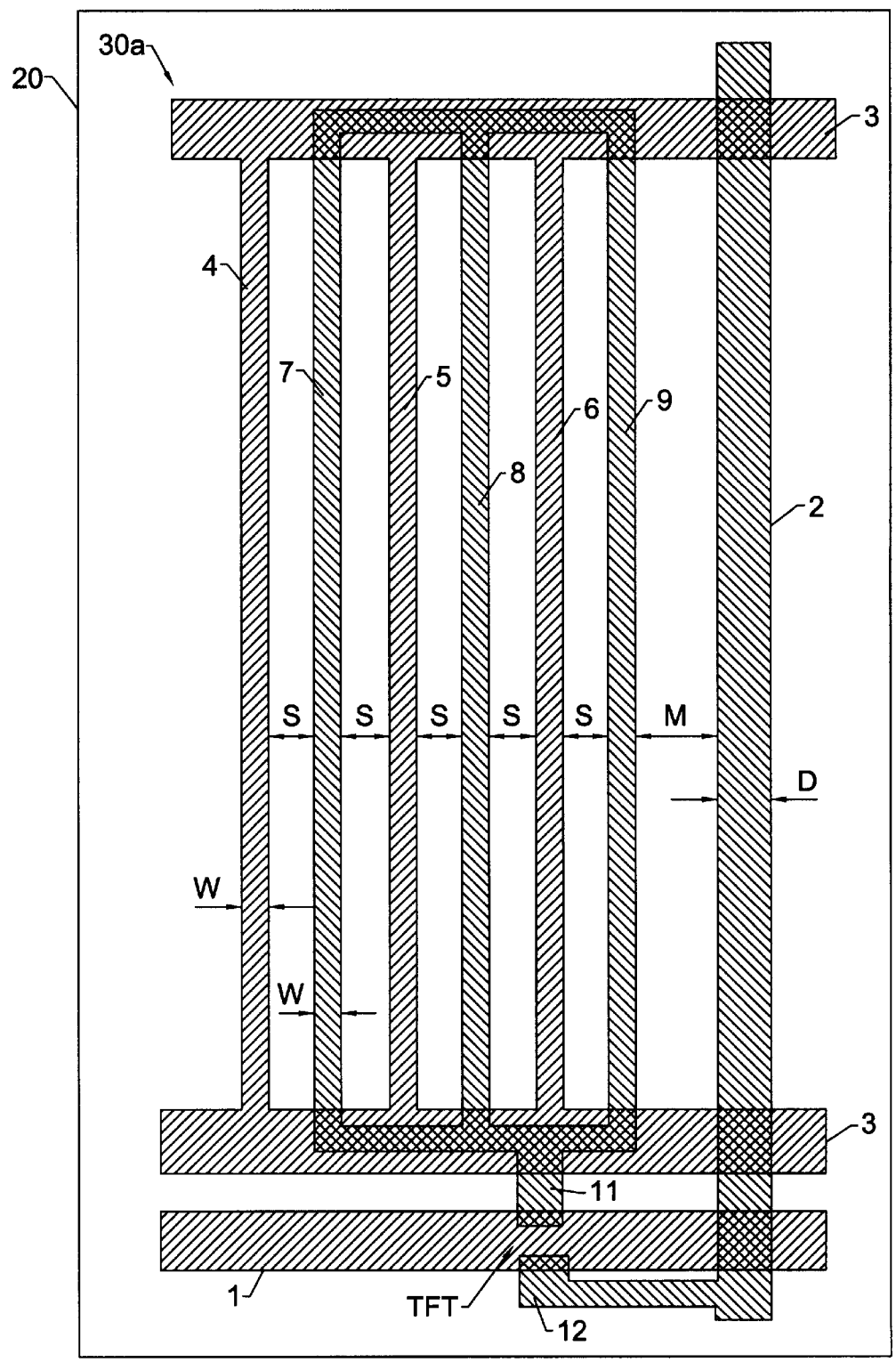
FIGS. 1 and 2 are plan views illustrating alternative configurations of a panel for IPS type LCD device.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, sizes and thickness of regions may be exaggerated for clarity, and like numbers refer to like elements throughout.

FIG. 1 shows a pixel 30a of a panel of an IPS type LCD device. A gate line 1 and a data line 2 are formed on a substrate 20 in a transverse direction and a longitudinal direction, respectively. Common electrode lines 3 are formed parallel to the gate line 1, and a plurality of common electrodes 4, 5, 6 are formed parallel to the data line 2, connected to the common electrode lines 3. A plurality of pixel electrodes 7, 8, 9 are formed interspersed among the common electrodes 4, 5, 6, parallel to the data line 2. The pixel electrodes 7,8,9 are connected to drain electrode 11 of a thin-film transistor TFT. A portion of the gate line 1 serves as a gate electrode of the thin-film transistor TFT, and a source electrode 12 of the thin-film transistor TFT is connected to the data line 2. One common electrode 4 is disposed at the left side of the pixel 30a, while one pixel electrode 9 is disposed at the right side of the pixel, nearest to the data line 2. The pixel electrodes 7, 8, 9 may be formed from the same material layer as the data line 2.

The common electrodes 4, 5, 6 and the pixel electrodes 7, 8, 9 preferably have a width W which is a first minimum width $W_{min1}$ according to a design rule such as a photolithographic margin and/or a maximum resistance. The gaps S between the common electrodes 4, 5, 6 and the pixel electrodes 7, 8, 9 preferably have a first maximum width $S_{max1}$ according to a design rule such as a maximum driving voltage. Similarly, the data line 2 has a width D which is a second minimum width $W_{min2}$ according to a design rule such as a photolithographic margin and/or a maximum resistance.

Figure 2:
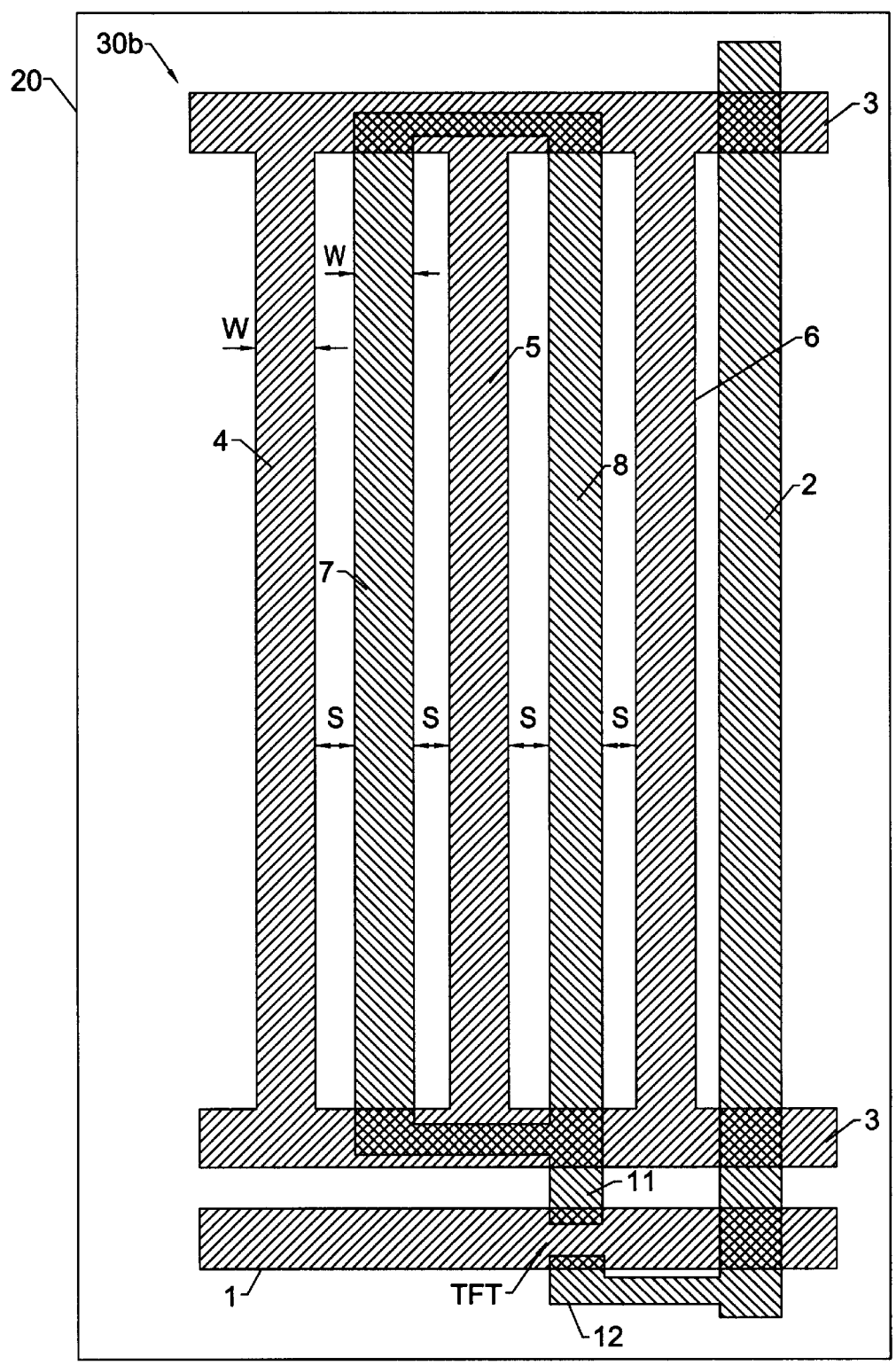

For the configuration shown in FIG. 1, a pixel electrode 9 is the nearest electrode to the data line 2. As the pixel electrode 9 and the data line 2 may be formed from the same material layer in the same process step, the coupling capacitance between them can reduce the image quality. In contrast, a common electrode may be formed laterally closer to the data line in comparison to a pixel electrode, allowing a pixel in which a common electrode is neighbors the data line 2 (as illustrated in FIG. 2) to have a greater aperture ratio. However, for the configuration illustrated in FIG. 1, if the size of the pixel results in a gap M between the data line 2 and the neighboring pixel electrode 9 which has a minimum value $S_{min1}$ according to a design rule such as a photolithographic margin and/or a maximum coupling capacitance, then the pixel may achieve an optimal aperture ratio. If a common electrode 6 is the nearest electrode to the data line 2, as illustrated in FIG. 2, and the gap between the data line 2 and the neighboring pixel electrode 6 has a minimum value $S_{min2}$ according to a design rule such as a photolithographic margin and/or a maximum coupling capacitance, then the LCD may achieve an optimal aperture ratio.

Referring to FIG. 1, because pixel size typically is determined without consideration of minimum electrode widths and maximum and minimum gaps between electrodes, a case may arise in which the gap M, which does not contribute to the effective display area, is smaller than $S_{max1}+S_{min2}+W_{min1}$ but larger than $S_{min2}$. In other words, the gap M is too narrow to allow another common electrode to be placed between the rightmost pixel electrode 9 and the data line 2 while maintaining the maximum separation $S_{max1}$ from the pixel electrode 9, but is wider than the minimum width $S_{min2}$ which would maximize aperture ratio. FIG. 2 illustrates a pixel 30b of an IPS type LCD device which can avoid this problem by putting a common electrode 6 nearest to the data line 2, corresponding to the pixel configuration illustrated in FIG. 1 with the rightmost pixel electrode 9 removed and the gaps S between the electrodes maintain the same width $S_{max1}$ as in the configuration of FIG. 1. However, to fill the pixel area and provide a gap $M_2$ between the rightmost common electrode 6 and the data line 2 which has the minimum width $S_{min2}$, the width W of the electrodes is increased in comparison to those in the configuration of FIG. 1. Consequently, the aperture ratio may be reduced in comparison to the structure of FIG. 1.

Figure 3:
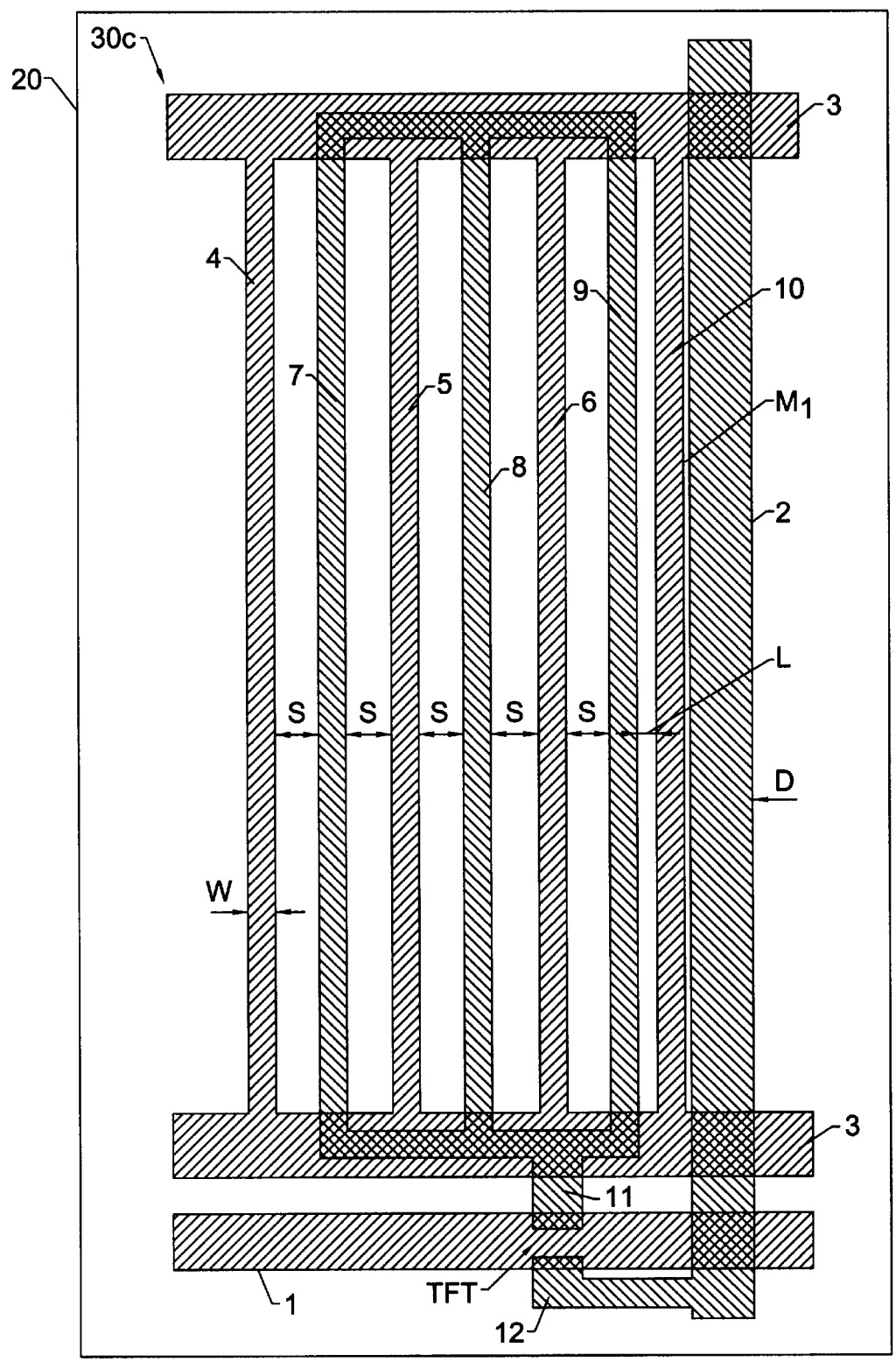
FIG. 3 is a plan view illustrating an embodiment of a panel for an IPS type LCD device according to the present invention.

According to one embodiment of the present invention illustrated in FIG.3, improved aperture ratio may be achieved by arranging electrodes of a pixel 30c such that an electrode nearest a bordering data line is spaced apart from an adjacent electrode by a gap which has a width which differs from the maximized gaps separating other electrodes in the pixel. As shown in FIG. 3, respective common electrodes 4, 5, 6 are spaced from respective pixel electrodes 7, 8, 9 by gaps S which are maximized according to a design rule such as a maximum driving voltage. However, a common electrode 10, formed between a pixel electrode 9 and a data line 2, is spaced apart from the pixel electrode 9 by a gap L which differs from the gaps S. The width of the common electrode 10 preferably is the same as that of the other electrodes, i.e., a width which is a maximum according to a design rule such as a maximum resistance. The gap $M_1$ between the common electrode 10 and the data line 2 preferably has a minimum width according to a design rule such as a photolithographic margin and/or a maximum coupling capacitance. A gap L between the common electrode 10 and the neighboring pixel electrode 9 is smaller than the gap S between the other electrodes, but can help contribute to the effective display area and improve aperture ratio.

Figure 4:
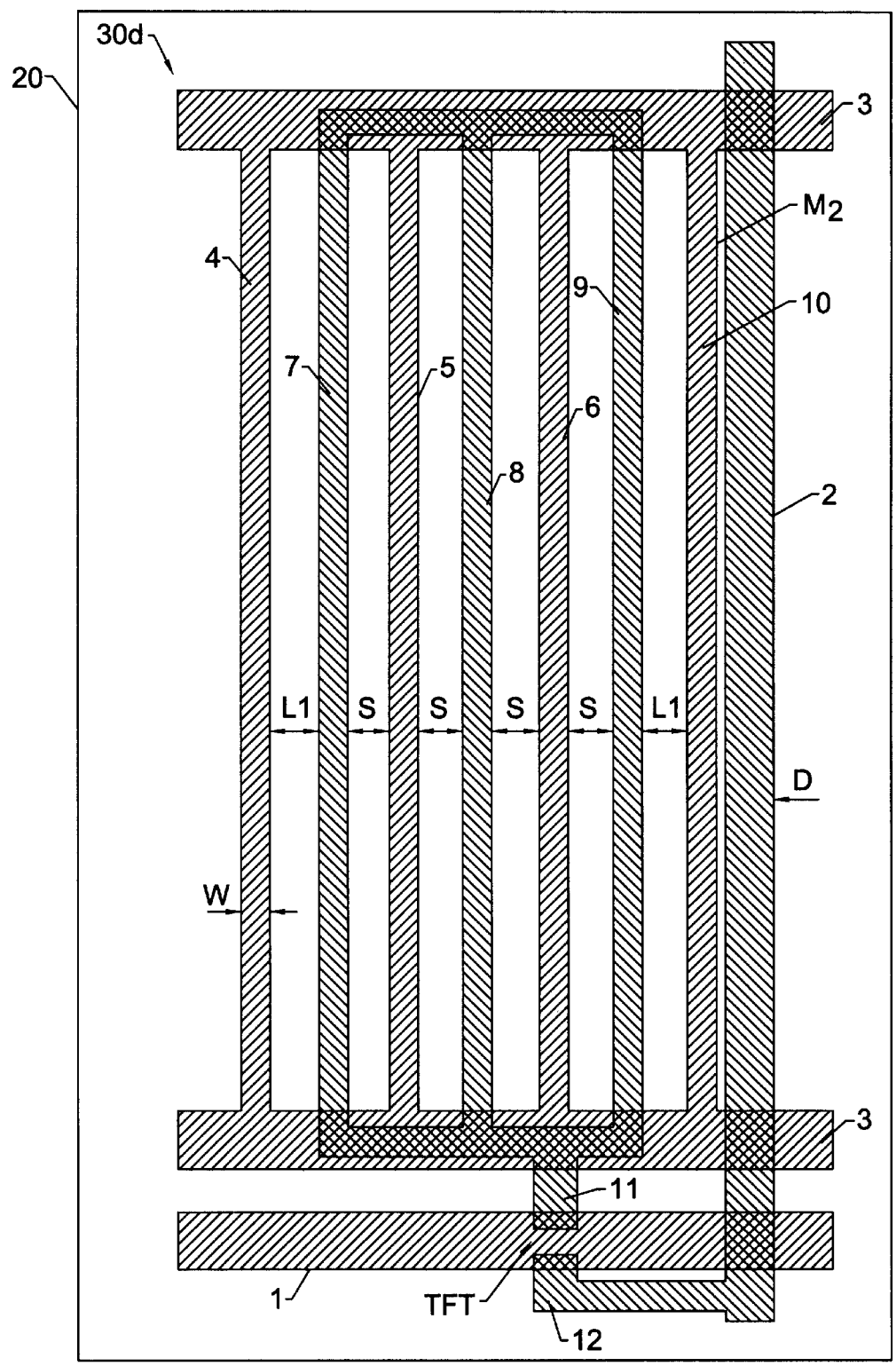
FIG. 4 is a plan view illustrating another embodiment of a panel for an IPS type LCD device according to the present invention.

According to another embodiment of the present invention illustrated in FIG. 4, electrodes which are disposed at outer portions of a pixel 30d are spaced from adjacent electrodes by gaps which differ from the maximized gaps separating other electrodes in the pixel. As illustrated in FIG. 4, respective common electrodes 5, 6 are spaced from respective pixel electrodes 7, 8, 9 by gaps S which are maximized according to a design rule such as a maximum driving voltage. However, a common electrode 10, formed between the pixel electrode 9 and the data line 2, and a common electrode 4, formed adjacent the pixel electrode 7, are spaced apart from pixel electrode 9 and pixel electrode 7, respectively, by gaps L1 which differ from the gaps S. Preferably, the outlying common electrodes 4, 10 have the same width as the other electrodes, i.e., a width minimized according to a design rule such as a maximum resistance, while the gap $M_2$ preferably has a width which is a minimum according to a design rule such as a photolithographic margin and/or a maximum coupling capacitance. The gaps L1 between the outlying common electrodes 4, 10 preferably have the same width, smaller than the gaps S, and can contribute to the effective display area and increase aperture ratio.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A panel for a liquid crystal display device, the panel comprising:
   a substrate;
   a data line on said substrate, extending along a first direction; and
   a pixel region on said substrate, disposed adjacent said data line;
   a plurality of spaced apart parallel elongate pixel electrodes disposed within said pixel region; and
   a plurality of spaced apart parallel elongate common electrodes disposed within said pixel region, parallel to said plurality of pixel electrodes, and positioned such that a respective pixel electrode is disposed adjacent and parallel to a respective common electrode,
   wherein said common and pixel electrodes define a plurality of gaps, a respective one of said gaps separating a respective pair of parallel adjacent common and pixel electrodes, wherein the gaps of said plurality of gaps are nonuniform in size and include a first group of gaps of a first size and a second group of gaps of a second size different from said first size, and wherein said first group of gaps comprises all of said plurality of gaps except a gap between one common electrode nearest said data line and a pixel electrode nearest said one common electrode.

2. A panel according to claim 1, wherein a one of said pixel electrodes and said common electrodes nearest to said data line is a common electrode.

3. A panel according to claim 1, wherein said second size is less than said first size.

4. A panel according to claim 1, wherein said common electrodes and said pixel electrodes have the same width.

5. A panel according to claim 1, wherein said pixel electrodes and said common electrodes are parallel to said data line.

6. A panel according to claim 5, wherein said common electrodes and said pixel electrodes have a minimum width according to a first design rule, wherein said data line has a minimum width according to a second design rule, wherein said first size is a maximum width according to a third design rule, wherein said second size is a minimum width according to a fourth design rule, and wherein said data line and one of said pixel electrodes and said common electrodes nearest said data line define a gap therebetween having a minimum width according to a fifth design rule.

7. A panel according to claim 6, wherein said first and second design rules each comprise a resistance criterion, wherein said third design rule comprises a driving voltage criterion, and wherein said fourth and fifth design rules each comprise at least one of a photolithographic margin criterion and a coupling capacitance criterion.

8. A panel for a liquid crystal display device, the panel comprising:
   a substrate;
   a data line on said substrate, extending along a first direction; and
   a pixel region on said substrate, disposed adjacent said data line;
   a plurality of spaced apart parallel elongate pixel electrodes disposed within said pixel region; and
   a plurality of spaced apart parallel elongate common electrodes disposed within said pixel region, parallel to said plurality of pixel electrodes, and positioned such that a respective pixel electrode is disposed adjacent and parallel to a respective common electrode,
   wherein said common and pixel electrodes define a plurality of gaps, a respective one of said gaps separating a respective pair of parallel adjacent common and pixel electrodes, wherein the plurality of gaps are nonuniform in size and include a first group of gaps of a first size and a second group of gaps of a second size different than said first size, and wherein said first group of gaps comprises all of said plurality of gaps except a gap between a first common electrode nearest said data line and a pixel electrode nearest said first common electrode and a gap between a second common electrode furthest from said data line and a pixel electrode nearest said second common electrode.

9. A method of fabricating a panel for a liquid crystal display device, the method comprising the steps of:
   forming a data line on a substrate, extending along a first direction; and
   forming a pixel on the substrate adjacent the data line, the pixel including a plurality of spaced apart parallel elongate common electrodes extending parallel to the data line and a plurality of spaced apart parallel elongate pixel electrodes extending parallel to the data line and to said plurality of pixel electrodes, and positioned such that a respective one of the pixel electrodes is disposed adjacent a respective one of the common electrodes,
   wherein the common and pixel electrodes define a plurality of gaps, a respective one of the gaps separating a respective pair of common and pixel electrodes, wherein the gaps of the plurality of gaps are nonuniform in size and include a first group of gaps of a first size and a second group of gaps of a second size different from said first size, and wherein the first group of gaps comprises all of the plurality of gaps except a gap between one common electrode nearest the data line and a pixel electrode nearest the one common electrode.

10. A method according to claim 9 wherein said step of forming a pixel comprises the steps of:
   forming the common electrodes and the pixel electrodes such that the common electrodes and the pixel electrodes have minimum first and second widths, respectively, according to a first design rule;

forming the data line such that the data line has a third minimum width according to a second design rule; and spacing the common electrodes, the pixel electrodes and the data line such that the first group of gaps have a minimum size according to a third design rule, the second group of gaps have a minimum size according to a fourth design rule and a gap separating the data line and one of the pixel electrodes and the common electrodes nearest the data line has a minimum size according to a fifth design rule.

11. A method according to claim 10, wherein the first and second design rules each comprise a resistance criterion, wherein the third design rule comprises a driving voltage criterion, and wherein the fourth and fifth design rules each comprise at least one of a photolithographic margin criterion and a coupling capacitance criterion.

12. A method according to claim 9, wherein one of the pixel electrodes and the common electrodes nearest the data line is a common electrode.

13. A method according to claim 9, wherein the second size is less than the first size.

14. A method according to claim 9, wherein the common electrodes and the pixel electrodes have the same width.

15. A method according to claim 9, wherein the step of forming a data line and the step of forming a pixel comprise the step of forming the data line and the pixel electrodes from a common material layer.

16. A method of fabricating a panel for a liquid crystal display device, the method comprising the steps of:

forming a data line on a substrate, extending along a first direction; and forming a pixel on the substrate adjacent the data line, the pixel including a plurality of spaced apart parallel elongate common electrodes extending parallel to the data line and a plurality of spaced apart parallel elongate pixel electrodes extending parallel to the data line and to said plurality of pixel electrodes, and positioned such that a respective one of the pixel electrodes is disposed adjacent a respective one of the common electrodes, wherein the common and pixel electrodes define a plurality of gaps, a respective one of the gaps separating a respective pair of common and pixel electrodes, wherein the gaps of the plurality of gaps are nonuniform in size and include a first group of gaps of a first size and a second group of gaps of a second size, and wherein the first group of gaps comprises all of the plurality of gaps except a gap between a first common electrode nearest the data line and a pixel electrode nearest the first common electrode and a gap between a second common electrode furthest from the data line and a pixel electrode nearest the second common electrode.

* * * * *